Jan. 18, 1938.  L. H. DAVIS  2,105,639
INDICATOR
Filed Nov. 30, 1936   2 Sheets-Sheet 1
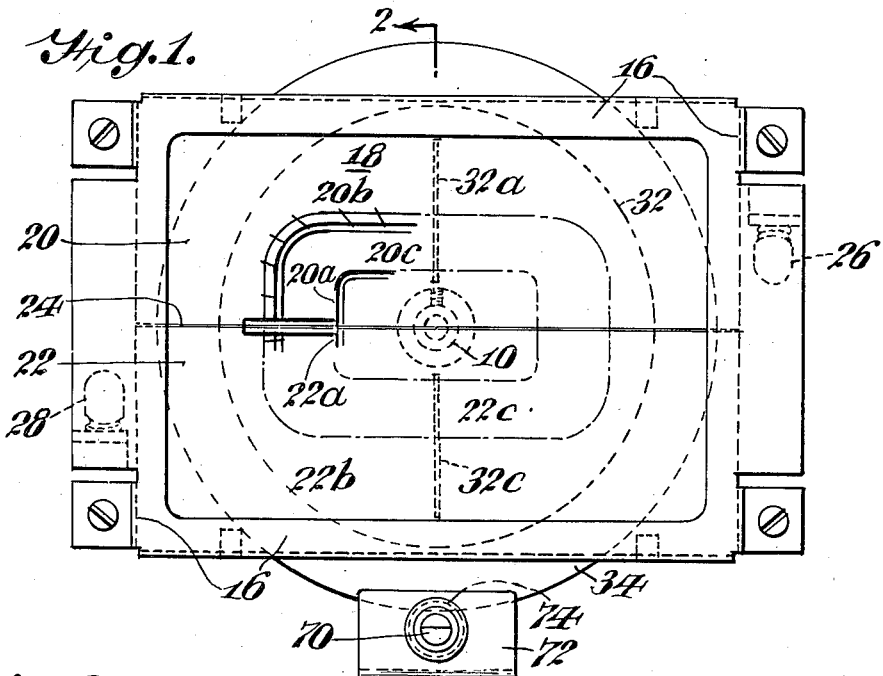
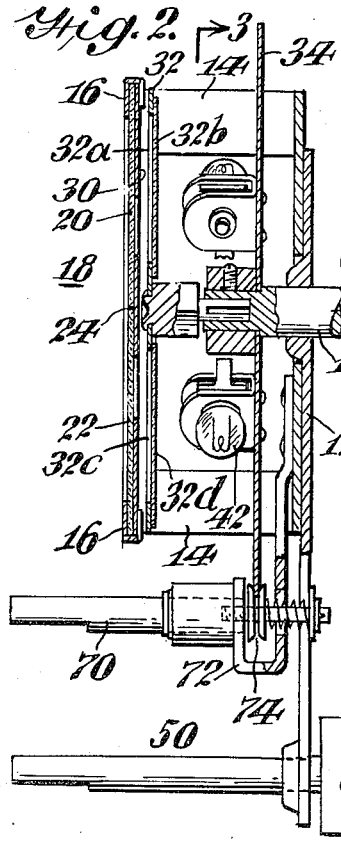
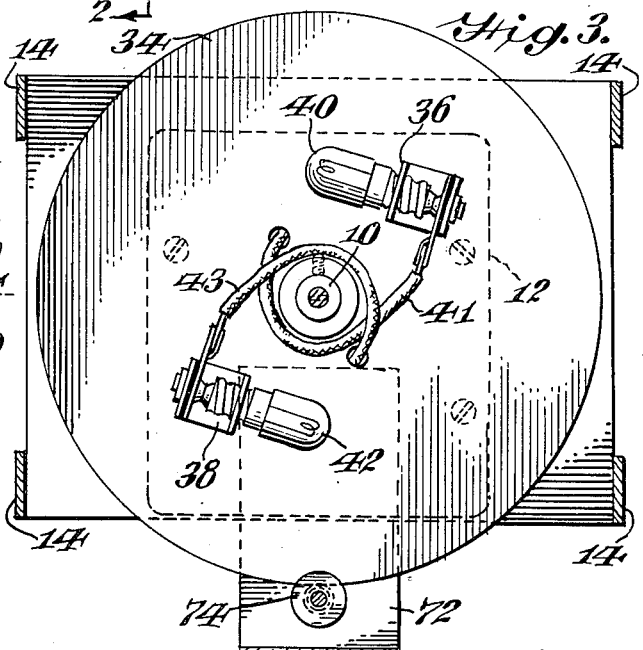
Inventor
Lewis H. Davis,
By
Attorney

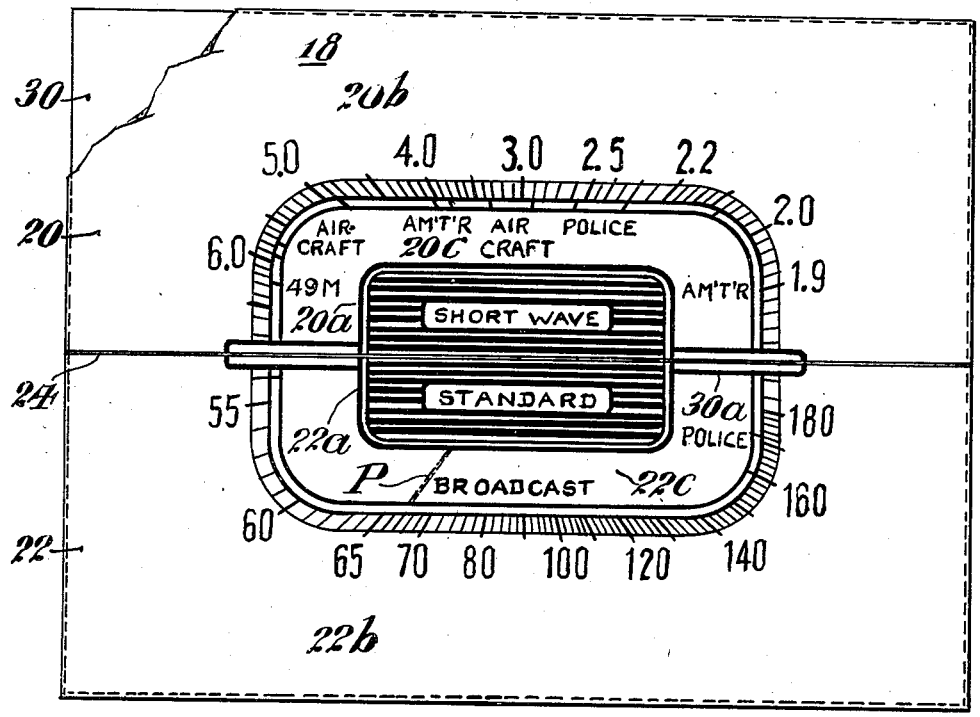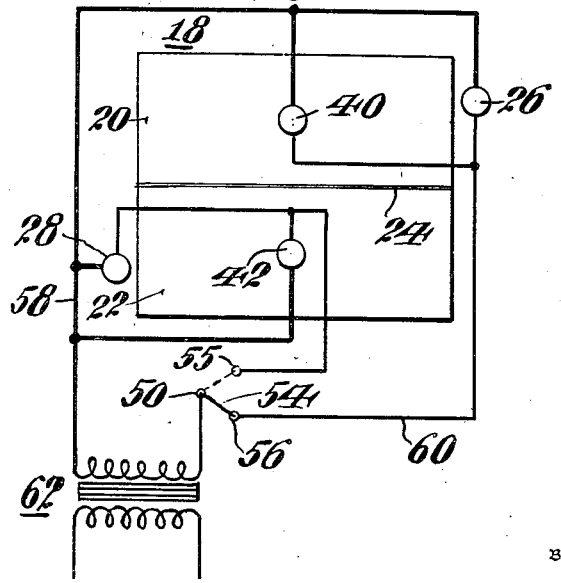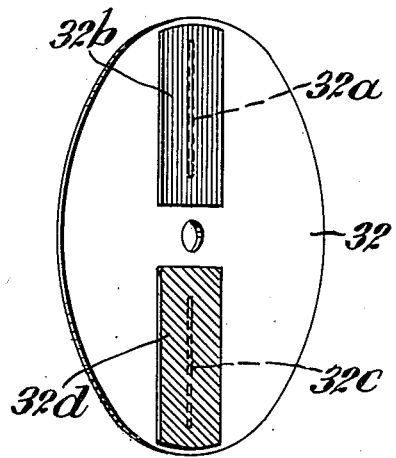

Patented Jan. 18, 1938

2,105,639

UNITED STATES PATENT OFFICE 2,105,639

INDICATOR

Lewis H. Davis, Haddonfield, N. J., assignor to Radio Corporation of America, a corporation of Delaware Application November 30, 1936, Serial No. 113,469

6 Claims. (Cl. 116—124.1)

This invention relates to multi-scale indicators, particularly to tuning indicators for radio apparatus and has for its principal object the provision of an indicator having a plurality of discrete frequency band scales with frequency indicating pointers individual thereto and to means rendering one scale and/or its pointer visible, and the other scales and pointers invisible, when the set is tuned to a selected frequency range.

Another object of the invention is to provide a simple, inexpensive and trouble-free indicator for radio receivers, wherein a positive indication of the particular frequency band in use is achieved by the application to the device of a minimum amount of torque or other force and without mechanically shifting the position of the scale-bearing surface or lifting a shutter or mask for said surface.

Certain details of construction, together with other objects and advantages, will be apparent and the invention itself will be understood by reference to the following specification and to the accompanying drawings wherein Figure 1 is a front elevation of a two-scale indicator constructed in accordance with the principle of the invention, Figure 2 is a cross sectional view taken on the line 2—2 of Fig. 1, Figure 3 is a front elevation of the device of Fig. 1 with the scale-bearing surface and frequency-indicating pointer device removed, Figure 4 is a front elevation of a scale-bearing surface having two scale areas marked with indicia of contrasting colors, and Figure 5 is a rear elevation of the disc of Figs. 1 and 2, having a plurality of slots therein for forming frequency-indicating pointers of colored light, Figure 6 is a schematic electrical diagram of a circuit for the lamps.

In the drawings 10 designates a tuning shaft which extends through and beyond a panel 12 of the chassis of a radio receiver. Brackets 14 fixed to panel 12 extend outwardly therefrom and support a frame 16 carrying a scale member 18, the center of the surface of which is preferably in line with the axis of the tuning shaft.

Member 18 may be constituted of a single sheet of glass or other transparent material, but is preferably composed of two half sections 20 and 22 of such material joined together along their edges as by an interposed layer of cement or other opaque material 24. This opaque material 24 serves to confine light provided by separately energized lamps 26 and 28 to one or the other of the discrete scale-bearing surfaces.

The number of scales marked on the continuous surface of member 18 corresponds to the number of frequency ranges or bands to which the set may be tuned, in this embodiment, two.

Fig. 4 shows a typical two-scale surface with the scales and indicia thereof marked, preferably on its rear surface, in the following distinctive colors: (1) The entire line design excepting numerals and lettering are colored "deep ivory"; (2) All numerals and lettering above the center line 24 and the spaces between parallel lines adjacent the graduations, 49M, Aircraft, etc., are colored red; (3) Green is the color of all numerals and lettering on the lower scale and also of the filled-in spaces indicating Police and Broadcast service bands.

The background of certain portions of the scale-bearing member 18 is rendered opaque, either by paint applied to the rear surface thereof or by a stationary plaque 30 which is mounted adjacent or contiguous this surface (see Fig. 2). The portions of the surface of member 18 which are rendered opaque are the central rectangular section 20a, 22a (which conceals the area adjacent the terminal of the tuning shaft 10) and sections 20b and 22b which lie beyond the peripheries of the respective scales. Where, as in the instant case, a plaque 30 is employed, the central solid portion thereof may be supported by arms 30a, which extend outwardly therefrom to the main body of the plaque.

The background of the otherwise transparent sections 20c and 22c of the scale-bearing member 18 is rendered opaque by a disc 32 (see Figs. 2 and 5), which is fixed on the tuning shaft 10 for rotation in a plane parallel to and adjacent the rear surface of the plaque 30. As more clearly shown in Fig. 5, this disc 32 is provided with a pair of oppositely-located, aligned slots 32a and 32c, one for each scale. Slot 32a, individual to the upper scale 20, is covered by a strip of translucent material 32b, which is preferably of the same color (in this case, red) as the indicia of the upper scale. Similarly, slot 32c, which is adjacent the lower scale, is spanned by a translucent strip 32d of a color (green) specific to said scale.

The main tuning shaft 10 also carries a disc 34, upon the front surface of which brackets 36 and 38 are affixed. The brackets each support a lamp 40, 42, respectively, preferably in direct alignment with the distinctively colored slits 32a, 32c in disc 32. Slack cables 41 and 43, which may conveniently be wrapped about the terminal section of shaft 10, as shown in Fig. 3, supply current for selectively energizing lamps 40 and 42 in a manner described in connection with Fig. 6. When one or the other of these lamps is energized, a pencil of light (P, Fig. 4) of a contour similar to that one of slots 32a and 32c through which the light passes will fall upon the particular scale with which that lamp and slot are associated. Since the slots 32 and lamps 40—42 move with the tuning shaft 10, the selectively-produced pencils of light will provide an accurate indication of the frequency to which the set is tuned.

Shaft 50 (Fig. 2) extends to a suitable range change mechanism, indicated generally at 52, and carries a switch arm 54 (Fig. 6) for controlling lamps 26, 28, and 40, 42, which are connected to switch contacts 55 and 56, by leads 58 and 60, respectively. Current for these lamps may be supplied through a suitable transformer 62 to one terminal of which the common return wire 58 for all of the lamps is connected. The other terminal 60 of the secondary winding of transformer 62 is connected to the switch arm 56, so that when shaft 50 is moved to change the frequency range or band of the receiver, arm 54 will complete the circuit to one or the other of these pairs of lamps, as determined by the particular frequency range selected.

The mechanism for rotating the tuning shaft 10 (and hence the frequency indicating pencil of light formed by lamp 40 and slit 34a or lamp 42 and slit 34c) may be of any suitable or convenient type. Thus, as shown in Fig. 2, a tuning control shaft 70, which will be understood to extend through the front panel of the set, and which is supported as by a bracket 72 affixed to chassis 12, carries a bi-part spool 74 which grips the periphery of the disc 34 upon which lamps 40 and 42 are carried. Torque applied to control shaft 70 will be transferred through spool 74 and disc 34 to the main tuning shaft 10 which, in rotating, varies the frequency of the tuning element C in a known manner.

The visual indication provided by the pencil of light upon the substantially rectangular scales of the drawings is quite different from that produced by a pointer traveling about a circular scale. This difference may be attributed in part to the fact that the axis of rotation of the pointer in the instant case is hidden from the observer so that the pencil of light in its travel appears to "float" up and across and down the scale and to change its length (for instance, at the corners of the rectangle) wherever this is necessary to completely span the surface of the scale.

While the invention has been described as embodied in a radio receiver having but two frequency ranges, it is to be understood that the invention is not limited to such application, as the disclosure in this respect is merely illustrative for the purpose of explaining the inventive concept.

What is claimed is:

1. In multi-range radio apparatus having means for changing the frequency range of said apparatus, a surface having a plurality of discrete scales thereon, each of said scales representing one frequency range of said apparatus, means responsive to the operation of said range change means for illuminating a selected one of said scales and for producing a frequency-indicating pencil of light upon said selected one of said scales, and means for moving said pencil of light about the said selected scale.

2. In multi-range radio apparatus having means for changing the frequency range of said apparatus, an opaque surface having a plurality of discrete translucent scales thereon, each of said scales representing one frequency range of said apparatus, means responsive to the operation of said range change means for illuminating a selected one of said scales and for producing a frequency-indicating pencil of light of distinctive color upon said selected one of said scales, and means for moving said pencil of light about the said selected scale.

3. In multi-range radio apparatus having means for changing the frequency range of said apparatus, an opaque surface having a plurality of discrete, distinctively colored, translucent scales thereon, each of said scales representing one frequency range of said apparatus, means responsive to the operation of said range change means for illuminating a selected one of said scales and for producing a correspondingly colored frequency-indicating pencil of light upon said selected one of said scales and means for moving said colored pencil of light about the said selected scale.

4. In multi-range radio apparatus having means for changing the frequency range of said apparatus, a continuous surface constituted by a plurality of scale-bearing members joined in edge-to-edge relation with an interposed layer of opaque material therebetween, the number of said discrete scale-bearing members corresponding to the number of separate bands to which said apparatus may be tuned, means disposed adjacent an edge of said surface for illuminating a selected one of said scale-bearing members, means for producing a frequency indicating pointer of light upon said selected one of said scale-bearing members, said edge-illuminating means and said frequency-indicating pointer being responsive to the operation of said range change means, and means for moving said pointer of light about said selected one of said scales.

5. In multi-range radio apparatus having means for changing the frequency range of said apparatus, an opaque surface having a plurality of discrete translucent scale areas thereon, each of said scale areas representing one frequency range of said radio apparatus, a mask in the form of a disc mounted for movement about a central axis in the rear of said opaque surface, said masks being provided with a plurality of elongated slits individual to said scale areas, lamps individual to said slits mounted behind said mask, means connected to said range change means for selectively illuminating said lamps whereby to project a frequency-indicating pencil of light upon a selected one of said scale areas and means for moving said mask and hence said pencil of light about the selected scale area.

6. In multi-range radio apparatus having means for changing the frequency range of said apparatus, an opaque surface having a plurality of discrete translucent scale areas thereon, each of said scale areas representing one frequency range of said radio apparatus, a mask in the form of a disc mounted for movement about a central axis in the rear of said opaque surface, said mask being provided with a plurality of elongated slits individual to said scale areas, a second mask mounted behind said first-mentioned mask and for movement therewith, a plurality of lamps mounted on said second mask in line with said respective slits, means connected to said range change means for selectively illuminating said lamps whereby to project a frequency-indicating pencil of light upon a selected one of said translucent scale areas, and means for moving said masks and hence said pencil of light about the selected scale area.

LEWIS H. DAVIS.